United States Patent
Heinen

(10) Patent No.: US 9,469,389 B2
(45) Date of Patent: Oct. 18, 2016

(54) AFFIXABLE AIRCRAFT BOARDING HANDRAIL

(71) Applicant: Michael L. Heinen, Waldo, WI (US)

(72) Inventor: Michael L. Heinen, Waldo, WI (US)

(*) Notice: Subject to any disclaimer, the term of this patent is extended or adjusted under 35 U.S.C. 154(b) by 65 days.

(21) Appl. No.: 14/527,934

(22) Filed: Oct. 30, 2014

(65) Prior Publication Data

US 2015/0175251 A1  Jun. 25, 2015

Related U.S. Application Data

(60) Provisional application No. 61/920,569, filed on Dec. 24, 2013.

(51) Int. Cl.
  *B64C 1/14* (2006.01)
  *B64C 1/24* (2006.01)

(52) U.S. Cl.
  CPC .............. *B64C 1/1461* (2013.01); *B64C 1/24* (2013.01)

(58) Field of Classification Search
  CPC ..... B64C 1/24; B64C 1/1407; B64C 1/1423; B64C 1/143; B64C 1/1461; A61G 2003/068
  See application file for complete search history.

(56) References Cited

U.S. PATENT DOCUMENTS

| | | | | |
|---|---|---|---|---|
| 2,196,546 A | * | 4/1940 | Bowers | B64C 1/1407 182/77 |
| 2,551,345 A | * | 5/1951 | Scott | B63B 27/14 105/326 |
| 2,931,599 A | * | 4/1960 | McQuilkin | B64C 1/1407 16/366 |
| 3,403,749 A | * | 10/1968 | Warren | B64C 1/24 182/106 |
| 4,014,486 A | * | 3/1977 | Nelson | B64C 1/24 105/447 |
| 4,086,726 A | * | 5/1978 | Moses | B64C 1/24 244/129.5 |
| 7,677,494 B2 | * | 3/2010 | Yada | B64C 1/143 14/71.1 |
| 8,157,215 B2 | * | 4/2012 | Yada | B64C 1/1423 244/129.5 |
| 2011/0090680 A1 | * | 4/2011 | Steinkraus | F21V 14/04 362/217.05 |
| 2014/0264221 A1 | | 9/2014 | Boren | |

* cited by examiner

*Primary Examiner* — Philip J Bonzell
*Assistant Examiner* — Michael Kreiner
(74) *Attorney, Agent, or Firm* — Ziolkowski Patent Solutions Group, SC

(57) ABSTRACT

An aircraft boarding handrail that is affixable to an aircraft fuselage having an entry and exit staircase assembly formed in a cabin door of the aircraft fuselage is disclosed. The aircraft boarding handrail includes a rail member and a mounting structure coupled to the rail member and configured to secure the rail member to the aircraft fuselage. The mounting structure includes a guide pin that interfits with a guide pin slot of a doorframe of the cabin door, a mounting bracket having a notch formed therein constructed to interfit with a staircase support strut mount of the entry and exit staircase assembly, a latch arm coupled to the mounting bracket so as to be rotatable between an open position and a closed position to selectively provide access to and close off the notch, and a quick release pin to lock the latch arm in place when in the closed position.

17 Claims, 5 Drawing Sheets

AFFIXABLE AIRCRAFT BOARDING HANDRAIL

CROSS-REFERENCE TO RELATED APPLICATION

The present application is a non-provisional of, and claims priority to, U.S. Provisional Patent Application Ser. No. 61/920,569, filed Dec. 24, 2013, the disclosure of which is incorporated herein by reference in its entirety.

BACKGROUND OF THE INVENTION

Embodiments of the invention relate generally to aircraft boarding handrail systems and, in particular, to an affixable aircraft boarding handrail that is attachable to and removable from an aircraft fuselage, so as to provide assistance to passengers boarding and exiting the aircraft.

Smaller private aircraft—such as Learjet—are used to fly smaller groups of passengers to a variety of destinations in order to provide increased convenience and comfort to passengers, and to provide access to destinations not always accessible by larger aircraft. The use of such private aircraft has continued to increase over the years, as businesses have expanded their use of such aircraft and as the concept of fractionalized ownership (e.g., NetJets) has gained in popularity. In the future, it is expected that the use of and demand for private aircraft will continue to increase quite substantially.

Private aircrafts are typified by their use of an entry and exit staircase that allows passengers to enter and leave the aircraft through the main cabin door. The entry and exit staircase extends from the fuselage of the aircraft and down to the ground (i.e., rotates downward and outward) when desired so as to allow passengers to board and depart the aircraft. The entry and exit staircase then retracts when preparing to depart to form part of the aircraft fuselage.

While the entry and exit staircase on private aircraft provides great convenience to passengers with respect to the ease and speed with which they can board and exit the aircraft, a drawback of some private aircraft is that they do not contain a handrail that extends beyond the fuselage (i.e., do not extend along at least a partial length of the staircase) to assist passengers in ascending and descending the staircase. As a result, passengers with limited mobility may struggle to use the aircraft. Additionally, even those without limited mobility could benefit from the additional safety afforded by use of such a handrail when ascending and descending the staircase, as the handrail aids in providing support and balance to a passenger and may provide additional stability in inclement weather.

Therefore, there is a need for an aircraft boarding handrail designed useable with small private aircraft that would assist passengers in entering and leaving the aircraft. It would be desirable for such an aircraft boarding handrail to be quickly attachable and detachable from the aircraft fuselage, so as to not interfere with normal operation of the main cabin door and the extending and retracting of the entry and exit staircase.

BRIEF DESCRIPTION OF THE INVENTION

In accordance with one aspect of the invention, an aircraft boarding handrail is provided that is affixable to an aircraft fuselage having an entry and exit staircase assembly formed in a cabin door of the aircraft fuselage. The aircraft boarding handrail includes a rail member and a mounting structure coupled to the rail member and configured to secure the rail member to the aircraft fuselage, with the mounting structure further including a guide pin constructed to interfit with a guide pin slot of a doorframe of the cabin door, a mounting bracket having a notch formed therein that is constructed to interfit with a staircase support strut mount of the entry and exit staircase assembly, a latch arm coupled to mounting bracket so as to be rotatable between an open position and a closed position to selectively provide access to and close off the notch formed in the mounting bracket, and a quick release pin to lock the latch arm in place when in the closed position.

In accordance with another aspect of the invention, an aircraft boarding handrail is provided that is affixable to an aircraft fuselage that includes an entry and exit staircase assembly formed in a cabin door of the aircraft fuselage. The aircraft boarding handrail includes a rail member graspable by a passenger and a mounting structure affixed to the rail member and constructed so as to be selectively coupleable to and decoupleable from the aircraft fuselage. In being selectively coupleable to the aircraft fuselage, the mounting structure provides a first mounting point and a second mounting point of the mounting structure to the aircraft fuselage, the first and second mounting points providing for alignment of the aircraft boarding handrail with the entry and exit staircase assembly and securing of the aircraft boarding handrail to the aircraft fuselage.

In accordance with yet another aspect of the invention, an aircraft boarding handrail is provided that is affixable to an aircraft fuselage that includes an entry and exit staircase assembly formed in a cabin door of the aircraft fuselage. The aircraft boarding handrail includes a rail member and a mounting structure coupled to the rail member and configured to secure the rail member to the aircraft fuselage, with the mounting structure further including a guide pin constructed to interfit with a guide pin slot of a doorframe of the cabin door and a mounting bracket having a notch formed therein that is constructed to interfit with a staircase support strut mount of the entry and exit staircase assembly. The guide pin and the notch in the mounting bracket provide a first mounting point and a second mounting point between the mounting structure and the aircraft fuselage, the first and second mounting points providing for securing of the aircraft boarding handrail to the aircraft fuselage and preventing rotation of the aircraft boarding handrail.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention provide an affixable aircraft boarding handrail designed to interfit with the existing features and components of the main cabin doorframe of the aircraft fuselage. The aircraft boarding handrail is mounted to the aircraft fuselage at two contact or mounting points in order to secure the handrail to the aircraft fuselage, provide for proper alignment of the handrail, and prevent rotation of the handrail.

Figure 1:
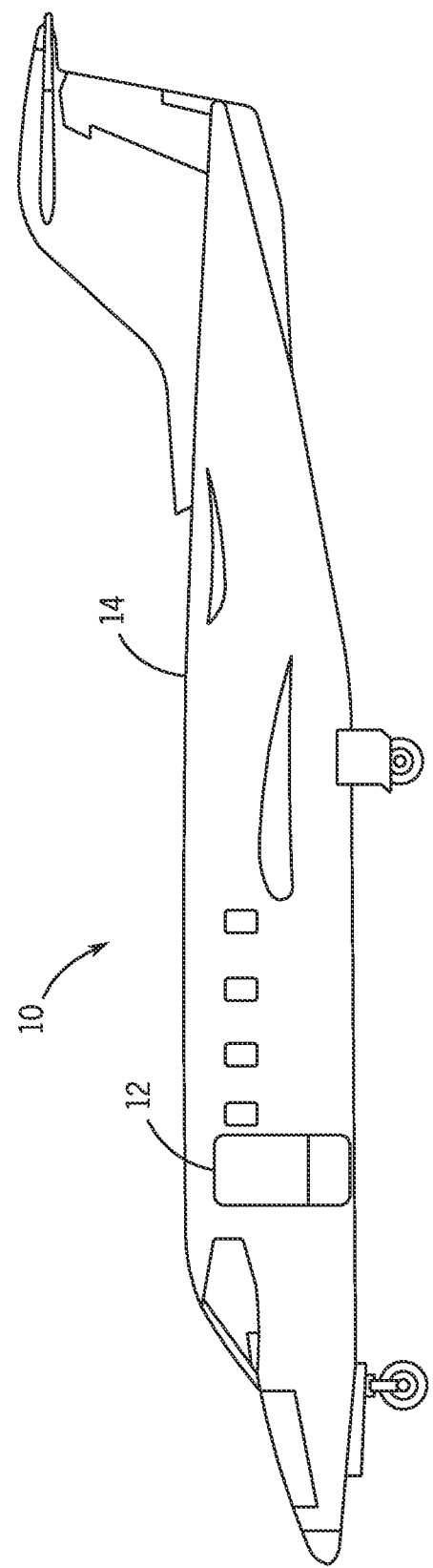
FIG. 1 is a plan view of a private aircraft with which embodiments of the invention may be used.

Referring to FIG. 1, an example aircraft 10 is illustrated on which an affixable handrail, according to embodiments of the invention, may be employed. The aircraft 10 is a "private aircraft" or "private jet," examples of which are a Learjet Model 40, 45, 70, or 75 aircraft, or other known make/model of private aircraft. Regardless of the exact make and model of the aircraft, the aircraft 10 is typified by its inclusion of a main cabin door 12 formed in the aircraft fuselage 14 that allows for passengers to board and depart the aircraft directly without the use of a tunnel and aircraft boarding bridge.

Figure 2:
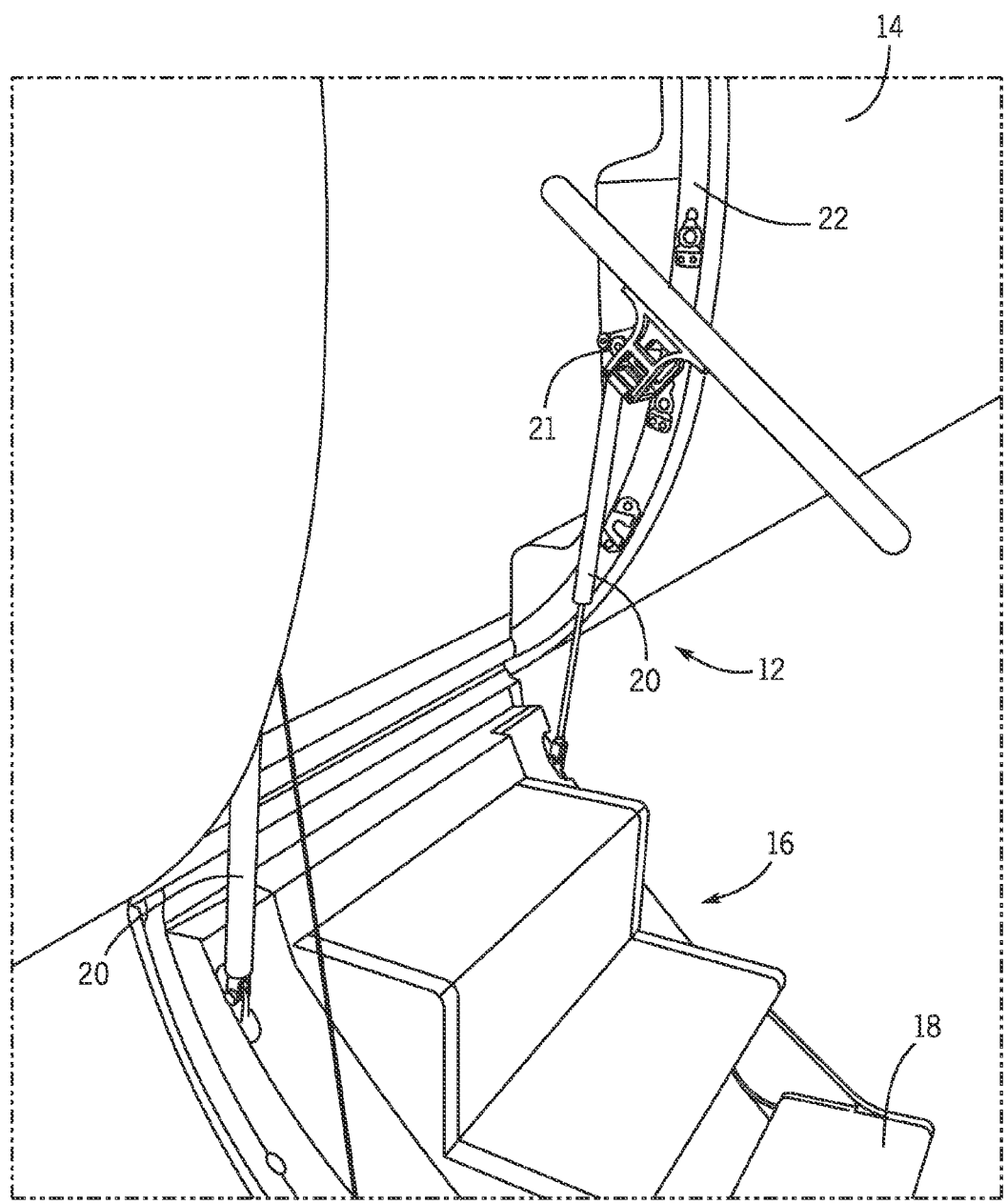
FIG. 2 is a view of the cabin doorframe and entry and exit staircase assembly of the aircraft of FIG. 1 having an aircraft boarding handrail affixed thereto, according to an embodiment of the invention.

Referring now to FIG. 2, the main cabin door 12 of the aircraft 10 is shown in more detail. As seen in FIG. 2, the main cabin door is constructed to include an entry and exit staircase assembly 16 that is rotatable between an open position and closed position. The entry and exit staircase assembly 16 is illustrated in an open/retracted position in FIG. 2 and includes a staircase 18 and a pair of staircase support struts 20. The staircase support struts 20 are rotatably mounted to a doorframe 22 of the cabin door 12 on a first end thereof via a support strut mount 21 and are mounted to the staircase 18 on a second end thereof, with the struts 20 allowing the staircase 18 to be raised and lowered in a controlled fashion—such as via pneumatic cylinders included in the struts.

Also shown in FIG. 2 is an aircraft boarding handrail 24 that is affixable to the aircraft fuselage 14 when the entry and exit staircase assembly 16 is in the open/down position, with the aircraft boarding handrail 24 functioning to provide assistance to passengers when ascending and descending the staircase 18. The aircraft boarding handrail 24 is attached to the cabin doorframe 22 of the fuselage 14 so as to extend outward therefrom and align with the stairs 18, such that it may be grasped by a passenger as the ascend or descend the staircase 18. As will be explained in greater detail below, the aircraft boarding handrail 24 is constructed so as to allow for attachment/installation of the handrail after the cabin door is opened and the staircase is lowered and for detachment/removal of the handrail before the door is closed, all within a short amount of time (e.g., several seconds), with the handrail 24 being secured to the doorframe in a manner that aligns the handrail with the staircase and prevents rotation/movement of the handrail.

Figure 3:
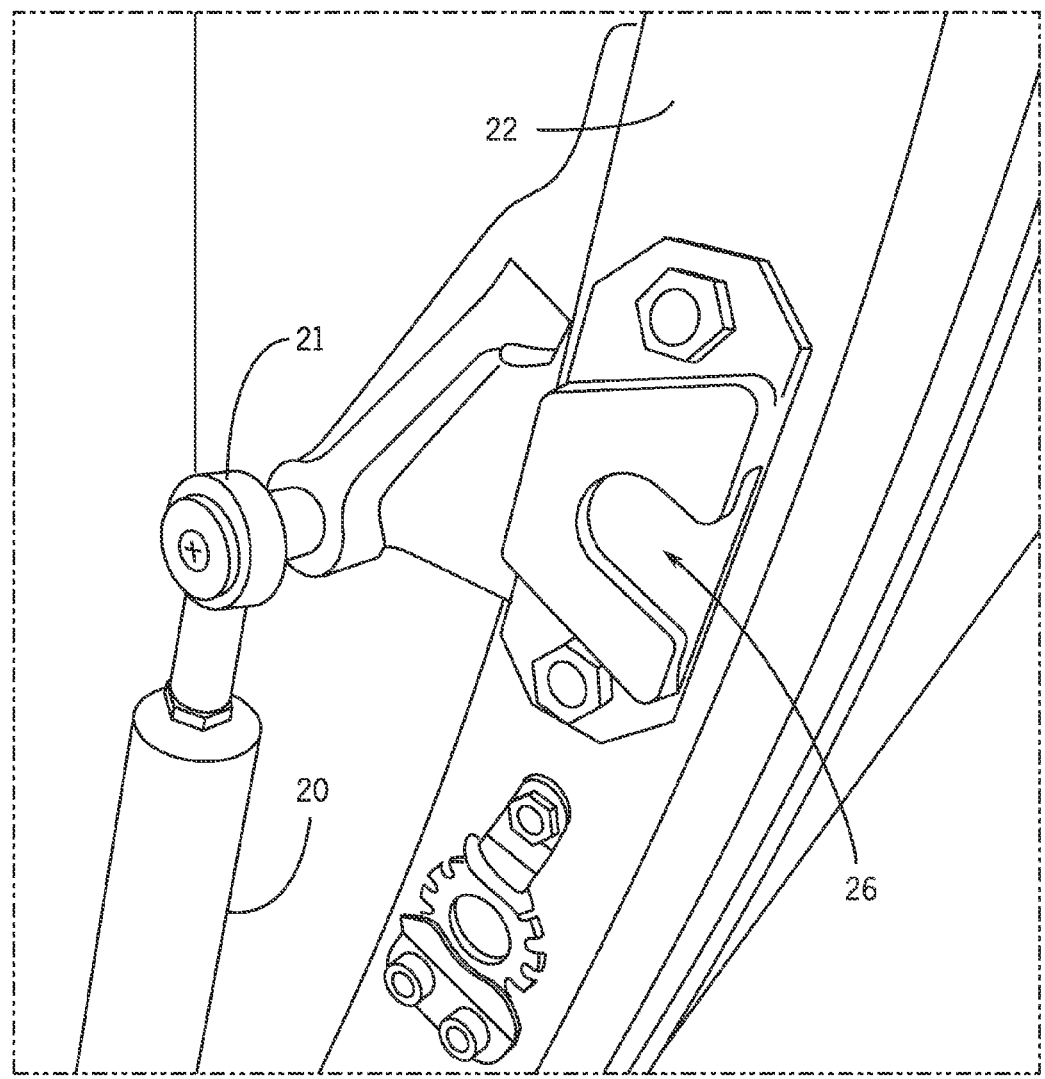
FIG. 3 is a view of existing structural features of the doorframe and entry and exit staircase assembly of the aircraft of FIG. 2.

The aircraft boarding handrail 24 is affixable to existing structures/components of the doorframe 22 and staircase assembly 16, such that the handrail 24 is easily attached to the aircraft without any modification. More specifically, and as shown in FIG. 3, the aircraft boarding handrail 24 is constructed to interfit with an existing slot 26 located in the aircraft cabin doorframe 22 ("doorframe guide pin slot") that receives with the cabin door/staircase assembly when in the closed position, and mate with the support strut mount 21 of the staircase support strut 20. The interfitting of the aircraft boarding handrail 24 with the guide pin slot 26 and the staircase support strut mount 21 will be discussed in greater detail here below with specific regard to the structure of the aircraft boarding handrail 24.

Figure 4:
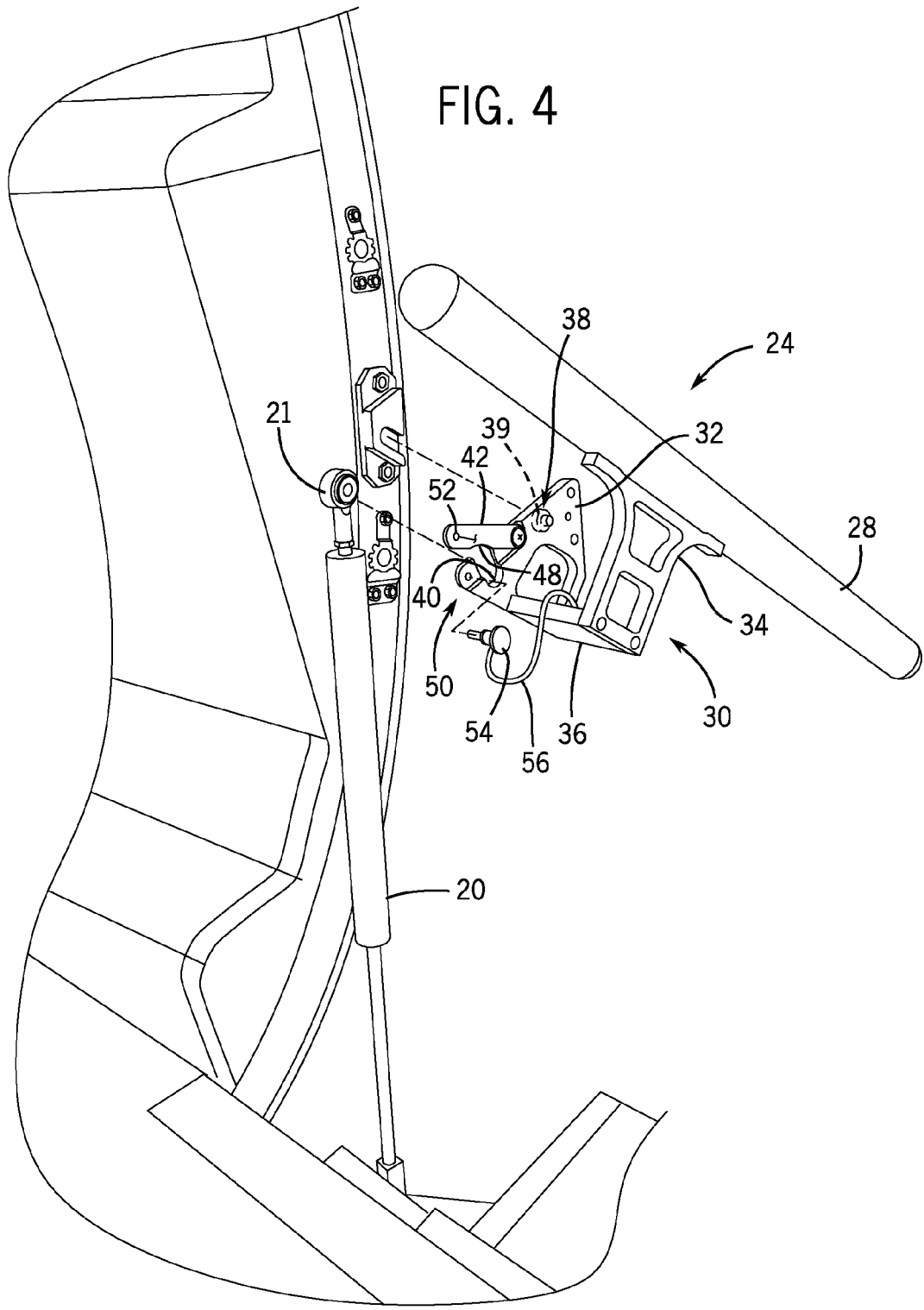
FIG. 4 is a perspective view of an aircraft boarding handrail, according to an embodiment of the invention.
Figure 5:
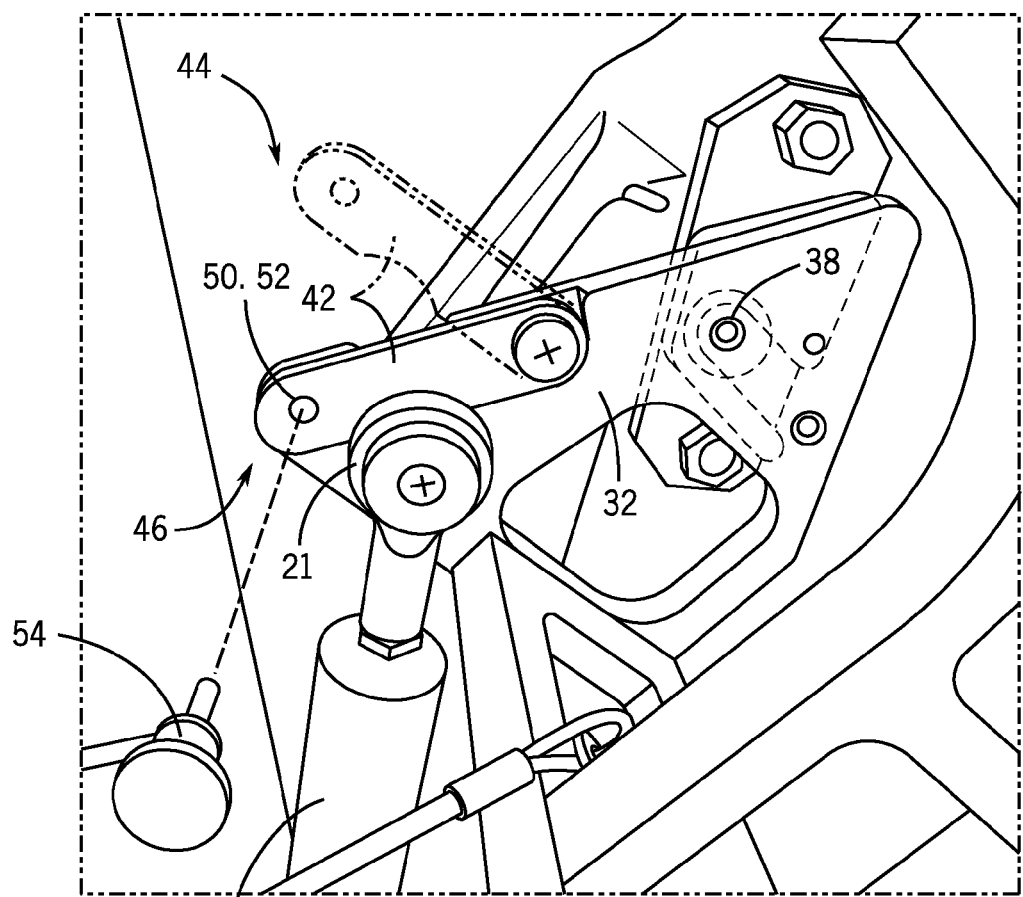
FIG. 5 illustrates the aircraft boarding handrail of FIG. 4 secured on the doorframe of an aircraft fuselage.
Figure 6:
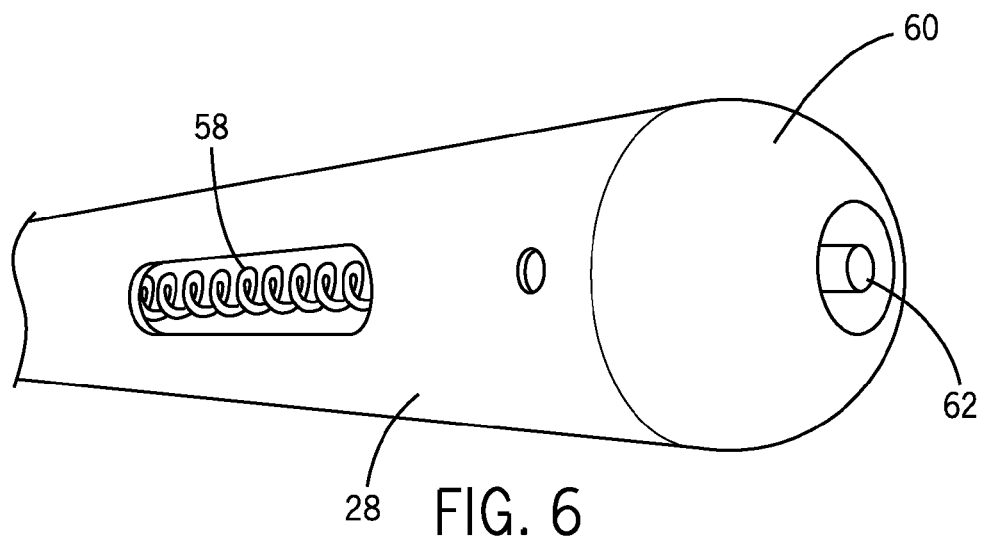
FIG. 6 is a perspective view of a portion of the aircraft boarding handrail of FIG. 4, illustrated a lighting element incorporated therein, according to an embodiment of the invention.

Referring now to FIGS. 4-6, detailed views of the aircraft boarding handrail 24 are provided, along with detailed views of how the handrail is affixed to the aircraft fuselage 14 of the aircraft 10. Referring first to FIG. 4, the aircraft boarding handrail 24 is illustrated as generally including an elongated rail member 28 and a mounting structure 30 that is attached to the rail member 28. Included in the mounting structure 30 is an arrangement of brackets comprised of a mounting bracket 32, a rail bracket 34 and a bottom bracket 36, with the brackets being joined together in a generally U-shaped arrangement. The rail bracket 34 is affixed directly to the rail member 28 mounting bracket 32 so as to extend downwardly therefrom, with the bottom bracket 36 being affixed to the rail bracket 34 so as to be arranged generally perpendicular thereto. The mounting bracket 32 is affixed on the bottom bracket 36 opposite from the rail bracket 34 and is arranged in parallel with the rail bracket 34, such that the bottom bracket 36 thus serves to space the rail bracket 34 and the rail member 28 apart from the doorframe of the aircraft fuselage. The brackets 32, 34, 36 of the mounting structure 30 may be joined to one another and to the rail member 28 via a plurality of fasteners, according to one embodiment, although one having ordinary skill in the art would recognize that alternative methods of attachment could instead be used—such as the brackets 32, 34, 36 being welded to one another and to the rail member 28.

The mounting structure 30 further includes a guide pin 38 that functions as a mounting point or point of contact between the aircraft boarding handrail 24 and the aircraft fuselage 14. In an exemplary embodiment, and as shown in FIG. 4, the guide pin 38 is attached to or formed as part of the mounting bracket 32; however, it is recognized that in an alternative embodiment, the guide pin 38 could be attached to or formed in the rail member 28. While the guide pin 38 is shown in FIG. 4 as being attached to the mounting structure 30 via a fastener 40, it is contemplated that the guide pin 38 may be attached to the mounting bracket 32 via alternative means, such as an adhesive, or that the guide pin 38 may be formed integrally as part of the mounting bracket 32. In each case, the guide pin 38 is designed and constructed to interfit with the doorframe guide pin slot 26 (FIG. 3) located in the aircraft cabin doorframe 22, as the slot 26 is accessible when the cabin door 12 is open and the staircase assembly 16 is in the down position.

As can be seen in FIG. 4, the mounting bracket 32 includes a notch or groove 40 formed therein along an upper surface thereof, on a side of the mounting bracket 32 generally opposite from the guide pin 38. The notch 40 is sized and oriented so as to interfit with the staircase support strut mount 21 of the aircraft 10, while not allowing for movement of the support strut mount 21 once it is interfit with the notch 40.

To selectively provide access to the notch 40 and to close-off the notch 40, a latch arm 42 is provided on the mounting bracket 32. The latch arm 42 is coupled to the mounting bracket 32 (e.g., via a fastener) such that it is rotatable relative thereto, which allows for the latch arm 42 to be easily moved between an open position (first position) and a closed position (second position). When the latch arm 42 is in the open position, indicated at 44, access to the notch 40 of the mounting bracket 32 is provided, thereby enabling the mounting bracket 32 to be positioned such that a staircase support strut mount 21 can be interfit into the notch 40. When the latch arm 42 is in the closed position, indicated at 46 (in phantom), the notch 40 of the mounting bracket 32 is closed off, such that the staircase support strut mount 21 is enclosed within the notch 40 and secured therein.

According to an exemplary embodiment, a bottom surface of the latch arm 42 has a semi-circular shaped indentation 48 formed therein that is constructed to mate with an upper surface of the staircase support strut mount 21 (FIG. 3). The semi-circular shaped indentation 48 mates with the staircase support strut mount 21 so as to prevent movement of the staircase support strut mount 21 within the notch 40 when the latch arm 42 is in the closed position.

In order to allow for securing of the latch arm 42 in the closed position, the mounting bracket 32 includes a first orifice or pin hole 50 formed therethrough, and the latch arm 42 includes a second orifice or pin hole 52 formed therethrough. The first orifice 50 and the second orifice 52 are formed so as to be aligned when the latch arm 42 is in the closed position. A quick release pin 54 is provided for the mounting structure 30 that is insertable into the first and second orifices when they are aligned. When inserted through the first and second orifices, the quick release pin 54 functions to lock the latch arm 42 in the closed position, thereby preventing the staircase support strut mount 21 from translating/sliding out of the notch 40. To properly secure the quick release pin 54 when it is not in use (i.e., not inserted into the first and second orifices), the quick release pin 54 may be attached to any portion of the affixable aircraft boarding handrail 24 via a tether cord 56, in order to facilitate not losing the quick release pin 54. According to an exemplary embodiment, the tether cord 56 may be looped through an opening formed in the bottom bracket 36 or the rail bracket 34.

FIG. 5 provides a closer look at how the mounting structure 30 interfits with the doorframe guide pin slot 26 and the staircase support strut mount 21 (FIG. 3) in order to lock the aircraft boarding handrail 24 in place. In securing the aircraft boarding handrail 24 to the aircraft fuselage 14, the guide pin 38 of the mounting structure 30 is first slid into the doorframe guide pin slot 26 of the cabin door. Upon interfitting of the guide pin 38 into the doorframe guide pin slot 26, the mounting bracket 32 is then rotated upward—with the latch arm 42 in the open position—such that the notch 40 formed in the mounting bracket 32 is positioned about the staircase support strut mount 21. The latch arm 42 is then moved to the closed position, as shown in FIG. 5, and the quick release pin 54 is inserted into the first and second orifices 50, 52, thereby enclosing the staircase support strut mount 21 within the notch 40 and locking the aircraft boarding handrail 24 in place.

The interaction between the guide pin 38 and the doorframe guide pin slot 26 creates a first point of contact or mounting point, while the interaction of the notch 40 and latch arm 42 with the staircase support strut mount 21 creates a second point of contact or mounting point. Therefore, once the guide pin 38 has been interfitted with the doorframe guide pin slot 26, the notch 40 of the mounting bracket 32 has been interfitted with the staircase support strut mount 21, and the latch arm 42 has been locked in the closed position via the quick release pin 54, the boarding handrail 24 is secured via the first and second points of contact. As a result of the two points of contact/mounting points between the aircraft boarding handrail 24 and the doorframe of the aircraft fuselage 14, the boarding handrail 24 is locked in a single position when installation is complete, thereby preventing rotation of the aircraft boarding handrail 24.

Referring back to FIG. 4 and also now to FIG. 6, according to an exemplary embodiment of the invention, the rail member 28 of the aircraft boarding handrail 24 also includes a lighting element 58 that is incorporated therein. The lighting element 58 beneficially provides illumination of the staircase 18 in order to provide a further safety feature on the boarding handrail 24 by allowing passengers to see where they are stepping when boarding/exiting the aircraft, such as might be of importance when boarding/exiting the aircraft at night. According to one embodiment, the lighting element 58 is constructed as an array of light emitting diodes (LED) that provides downwash lighting, although it is contemplated that alternative types of lighting may be used. The array of LEDs 58 is positioned on an underside of the rail member 28 and may be shaped as, for example, a linear LED array that extends partially along a length of the rail member 28. In order to provide for easy on-off control of the lighting element 58, an end cap 60 at one end of the rail member 28 (or both end caps) includes a push button switch 62 incorporated therein for turning the lighting element 56 on and off.

Beneficially, embodiments of the invention thus provide an affixable aircraft boarding handrail 24 that provides increased accessibility and safety for passengers entering and leaving a smaller private aircraft that uses a rotatable entry and exit staircase for boarding the aircraft through the cabin door. The affixable aircraft boarding handrail 24 extends down along at least a partial length of the staircase such that it is graspable by passengers in order to support and stabilize them when boarding/exiting the aircraft. In addition, the affixable aircraft boarding handrail 24 is easily and quickly attachable and removable, so as not to slow down the boarding process. While embodiments of the affixable aircraft boarding handrail 24 shown and described above are references specifically for use with Learjet Model 40, 45, 70, and 75 aircraft, it is contemplated that the design and dimensions of the affixable aircraft boarding handrail 24 may be modified to interact with other aircraft makes and models.

Therefore, according to one embodiment, an aircraft boarding handrail is provided that is affixable to an aircraft fuselage having an entry and exit staircase assembly formed in a cabin door of the aircraft fuselage. The aircraft boarding handrail includes a rail member and a mounting structure coupled to the rail member and configured to secure the rail member to the aircraft fuselage, with the mounting structure further including a guide pin constructed to interfit with a guide pin slot of a doorframe of the cabin door, a mounting bracket having a notch formed therein that is constructed to interfit with a staircase support strut mount of the entry and exit staircase assembly, a latch arm coupled to mounting bracket so as to be rotatable between an open position and a closed position to selectively provide access to and close off the notch formed in the mounting bracket, and a quick release pin to lock the latch arm in place when in the closed position.

According to another embodiment, an aircraft boarding handrail is provided that is affixable to an aircraft fuselage that includes an entry and exit staircase assembly formed in a cabin door of the aircraft fuselage. The aircraft boarding handrail includes a rail member graspable by a passenger and a mounting structure affixed to the rail member and constructed so as to be selectively coupleable to and decoupleable from the aircraft fuselage. In being selectively coupleable to the aircraft fuselage, the mounting structure provides a first mounting point and a second mounting point of the mounting structure to the aircraft fuselage, the first and second mounting points providing for alignment of the aircraft boarding handrail with the entry and exit staircase assembly and securing of the aircraft boarding handrail to the aircraft fuselage.

According to yet another embodiment, an aircraft boarding handrail is provided that is affixable to an aircraft fuselage that includes an entry and exit staircase assembly formed in a cabin door of the aircraft fuselage. The aircraft boarding handrail includes a rail member and a mounting structure coupled to the rail member and configured to secure the rail member to the aircraft fuselage, with the mounting structure further including a guide pin constructed to interfit with a guide pin slot of a doorframe of the cabin door and a mounting bracket having a notch formed therein that is constructed to interfit with a staircase support strut mount of the entry and exit staircase assembly. The guide pin and the notch in the mounting bracket provide a first mounting point and a second mounting point between the mounting structure and the aircraft fuselage, the first and second mounting points providing for securing of the aircraft boarding handrail to the aircraft fuselage and preventing rotation of the aircraft boarding handrail.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An aircraft boarding handrail affixable to an aircraft fuselage that includes an entry and exit staircase assembly formed in a cabin door of the aircraft fuselage, the aircraft boarding handrail comprising:
    a rail member;
    a mounting structure coupled to the rail member and configured to secure the rail member to the aircraft fuselage, the mounting structure comprising:
        a guide pin constructed to interfit with a guide pin slot of a doorframe of the cabin door;
        a mounting bracket having a notch formed therein that is constructed to interfit with a staircase support strut mount of the entry and exit staircase assembly;
        a latch arm coupled to the mounting bracket so as to be rotatable between an open position and a closed position to selectively provide access to and close off the notch formed in the mounting bracket; and
        a quick release pin to lock the latch arm in place when in the closed position.

2. The aircraft boarding handrail of claim 1 wherein the mounting bracket includes a first pin hole formed therein and the latch arm includes a second pin hole formed therein, with the first pin hole being aligned with the second pin hole when the latch arm is in the closed position so as to enable insertion of the quick release pin therethrough to lock the latch arm in place when in the closed position.

3. The aircraft boarding handrail of claim 2 wherein, when the staircase support strut mount of the entry and exit staircase assembly is interfit with the notch in the mounting bracket and the quick release pin is inserted through the first pin hole and the second pin hole with the latch arm in the closed position, the staircase support strut mount is secured within the notch of the mounting bracket.

4. The aircraft boarding handrail of claim 1 wherein the latch arm comprises a bottom surface having semi-circular shaped indentation formed therein constructed to mate with an upper surface of the staircase support strut mount, so as to prevent movement of the staircase support strut mount within the notch when the latch arm is in the closed position.

5. The aircraft boarding handrail of claim 1 wherein the notch of the mounting structure is formed to interfit with the staircase support strut mount at a location of attachment between the staircase support strut mount and the doorframe.

6. The aircraft boarding handrail of claim 1 wherein, when the guide pin is interfit with the guide pin slot of the cabin door doorframe and the staircase support strut mount of the entry and exit staircase assembly is interfit with the notch in the mounting bracket with the latch arm in the closed position, a first point of contact and a second point of contact are formed between the aircraft boarding handrail and the aircraft fuselage.

7. The aircraft boarding handrail of claim 1 wherein the mounting structure further comprises:
    a rail bracket coupled to the rail member; and
    a bottom bracket coupled to each of the rail bracket and the mounting bracket, with the bottom bracket being positioned between the rail bracket and the bottom bracket so as to space the rail bracket and the rail member apart from the doorframe of the aircraft fuselage.

8. The aircraft boarding handrail of claim 1 wherein the guide pin is affixed directly to the mounting bracket, on a side thereof opposite from the rail member, to provide for an interfitting of the guide pin with the guide pin slot of the doorframe.

9. The aircraft boarding handrail of claim 8 wherein the mounting bracket includes an opening formed therein, and wherein the guide pin comprises a fastener formed therein mateable within the opening to secure the guide pin to the mounting bracket.

10. The aircraft boarding handrail of claim 1 wherein the guide pin is affixed directly to the rail member and extends out therefrom, to provide for an interfitting of the guide pin with the guide pin slot of the doorframe.

11. The aircraft boarding handrail of claim 1 wherein the rail member comprises a lighting element incorporated therein, the lighting element configured to provide downwash lighting onto the entry and exit staircase assembly.

12. The aircraft boarding handrail of claim 11 wherein the rail member comprises an end cap positioned at each end of the rail member, and wherein at least one of the end caps comprises a push button incorporated therein for turning the lighting element on and off.

13. The aircraft boarding handrail of claim 1 further comprising a tether cord attached to the quick release pin to couple the quick release pin to one of the rail member and the mounting structure.

14. An aircraft boarding handrail affixable to an aircraft fuselage that includes an entry and exit staircase assembly formed in a cabin door of the aircraft fuselage, the aircraft boarding handrail comprising:
    a rail member graspable by a passenger; and a mounting structure affixed to the rail member and constructed so as to be selectively coupleable to and decoupleable from the aircraft fuselage;

wherein in being selectively coupleable to the aircraft fuselage, the mounting structure provides a first mounting point and a second mounting point of the mounting structure to the aircraft fuselage, the first and second mounting points providing for alignment of the aircraft boarding handrail with the entry and exit staircase assembly and securing of the aircraft boarding handrail to the aircraft fuselage; and wherein the mounting structure comprises;

a guide pin constructed to mate with a guide pin slot of a doorframe of the cabin door; and a mounting bracket having a notch formed therein that is constructed to receive a staircase support strut mount of the entry and exit staircase assembly;

wherein the guide pin and the notch formed in the mounting bracket provide the first mounting point and the second mounting point of the mounting structure to the aircraft fuselage, the first and second mounting points providing for alignment of the aircraft boarding handrail with the entry and exit staircase assembly and securing of the aircraft boarding handrail to the aircraft fuselage; and wherein the guide pin is affixed directly to the mounting bracket via a fastener, on a side of the mounting bracket opposite from the rail member, to provide for an interfitting of the guide pin with the guide pin slot of the doorframe.

15. The aircraft boarding handrail of claim 14 wherein the mounting structure further comprises:

a latch arm coupled to mounting bracket so as to be rotatable between an open position and a closed position to selectively provide access to and close off the notch formed in the mounting bracket; and a quick release pin to lock the latch arm in place when in the closed position; wherein the mounting bracket includes a first pin hole formed therein and the latch arm includes a second pin hole formed therein, with the first pin hole being aligned with the second pin hole when the latch arm is in the closed position so as to enable insertion of the quick release pin therethrough to lock the latch arm in place when in the closed position.

16. The aircraft boarding handrail of claim 14 wherein the rail member comprises an array of light emitting diodes (LEDs) incorporated therein, the array of LEDs configured to provide downwash lighting onto the entry and exit staircase assembly.

17. An aircraft boarding handrail affixable to an aircraft fuselage that includes an entry and exit staircase assembly formed in a cabin door of the aircraft fuselage, the aircraft boarding handrail comprising:

a rail member; and a mounting structure coupled to the rail member and configured to secure the rail member to the aircraft fuselage, the mounting structure comprising:

a guide pin constructed to interfit with a guide pin slot of a doorframe of the cabin door; and a mounting bracket having a notch formed therein that is constructed to interfit with a staircase support strut mount of the entry and exit staircase assembly;

wherein the guide pin and the notch in the mounting bracket provide a first mounting point and a second mounting point between the mounting structure and the aircraft fuselage, the first and second mounting points providing for securing of the aircraft boarding handrail to the aircraft fuselage and preventing rotation of the aircraft boarding handrail.

* * * * *